Patented July 3, 1934

1,964,743

UNITED STATES PATENT OFFICE 1,964,743

METHOD OF SURFACING REFRACTORY ARTICLES AND THE PRODUCT THEREOF

Charles Ladd Norton, Boston, Mass., assignor to Babcock & Wilcox Company, Bayonne, N. J., a corporation of New Jersey No Drawing. Application May 8, 1930, Serial No. 450,869

3 Claims. (Cl. 51—278)

My invention relates to the surfacing or shaping of refractory articles, particularly such as are of substance too hard to yield to abrasives. An example of such refractory material is furnished by the refractory which is the subject matter of an application for United States Letters Patent, filed concurrently herewith by Anthony Maurice Kohler and myself, Serial No. 450,868. This material, briefly described, is represented by a brick-shape, of which the molded material is an aggregate of kaolin particles, previously burned to a hard dense clinker at a temperature approximately 3000° F., bonded with kaolin, the molded shape burned at a temperature approximating 3000° F., and soaked at that temperature for a considerable time, long enough to substantially fill the interparticle spaces with kaolin in incipient fusion, the article itself, on being cooled, having the said interparticle spaces largely filled with a composite of mullite crystals and silica, developed from the viscous material which occupied said spaces at the close of the heat-soak. Small, discernible voids remain, but these are discontinuous. Their presence, however, probably contributes materially to the efficiency of the surfacing operation herein described.

Large molded bodies of such material, made in the stated manner, for instance bodies of glass-tank block size, bulge more or less out of shape, and are therefore defective if the use to which they are intended requires them to have true surfaces as molded.

This material is extremely dense and hard, so that attempts to surface articles made of it, by abrasive means, have practically completely failed. Not only are the best available abrasive wheels rapidly destroyed by it, but the high temperatures locally developed,—even when cooling water is abundantly supplied,—almost invariably cause the refractory articles themselves to crack.

My method can be illustrated in principle, and practiced, though uneconomically, by a hand-controlled operation. Take for example a glass-tank block shape, of the above described refractory material, bulged out of plane at the sides, and press a chilled steel chisel-edged implement very heavily (two or three hundred pounds) against its surface at an oblique angle thereto, so that the roughnesses of the brick-material impact themselves into the softer and tougher material of the chisel, and continue the pressure on the chisel, preferably rocking the chisel a little on the edge. The indentations of the steel by the brick material produce local engagements, the continued pressure, with rocking of the chisel, will flake bits of the brick material from the refractory body, and thus produce fresh sharp points and edges of local fracture, which, as the pressure and slight movement of the chisel continues, will impact themselves into the chisel, and cause further local fracture and flaking. Some heat will be developed at the places of engagement and fracture, but nowhere nearly as much as results from an attempt to remove an equal mass of refractory material by abrasions.

An economical and efficient instrument for performing rapidly the flaking process above described is a wheel or plate of the general structure and configuration of the stone-polishing wheels shown in United States patents to George, No. 794,974, or Mills, No. 930,778, provided such helically ribbed wheels be made of rigid material like hard cast iron, and have their helical ribs stoutly proportioned. I have used such a wheel successfully as the instrument for exerting the pressure required for flaking hard refractory material, employing as the tools immediately acting on said material a large number of chilled steel shot, each about ⅛ inch in diameter, feeding the shot into the wheel as the wheel rests and rotates on or close to the surface of a refractory glass-tank block. The cam-action of the helical ribs of the wheel sweeps each steel shot toward the center of the wheel; each shot (like the cold chisel edge in the illustrative operation) is indented by projections or roughnesses on the refractory surface impacting against it; the following up of pressure due to the wheel action, and probably also the tendency of the shot to roll or rock, flakes off the engaged spot of refractory material, by local fracture which produces new points which impact against and engage by indentation either the same or another steel shot, and are flaked in turn. As the wheel both rotates and traverses over the material being surfaced, fresh supplies of shot are fed to it, while the work is kept flooded with water to prevent overheating.

The shot are broken during the surfacing operation, and a progressively increasing quantity of smaller and smaller steel bodies operates on the refractory material so that the detached flakes become smaller likewise, and the surface finally becomes quite smooth, decidedly smoother than that of the refractory block in its original condition. Glass-tank blocks thus surfaced make close contact with each other when assembled to form a tank wall and present close joints practically impenetrable by a charge of molten glass.

I claim:

1. The method of surfacing a refractory body which comprises producing grinding engagement under following pressure of a plurality of tough softer bodies with the surface of said refractory body to initially remove and embed in the soft tough bodies the more easily frangible refractory particles which thus form a future grinding surface of more effective grinding ability than the initial surface of the tough softer bodies, and then continuing the engagement under following pressure to produce further local fractures and abrasions of the harder body whereby the hard surfaces thus formed on the softer grinding bodies are continuously renewed as a step inherent in the surfacing of the harder body.

2. The method of surfacing hard burned refractory articles which comprises producing grinding engagement under following pressure between a tough material softer than the refractory to thereby release the more easily frangible surface particles which thus become embedded in the softer material to form a grinding surface of material equally as hard as the refractory article, and then continuing grinding engagement under following pressure between the tough softer material thus surfaced and the surface of the refractory article.

3. The method of surfacing a refractory body of extreme hardness which comprises producing grinding engagement under following pressure between steel shot that are softer than the refractory body, and the surface of said refractory body, to initially remove and embed in said shot the more easily frangible refractory particles which thus form a future grinding surface of more effective grinding ability than the initial surface of said shot, and then continuing the engagement under following pressure to produce further local fractures and abrasions of the refractory body, whereby the hard surfaces thus formed on the shot are continuously renewed as a step inherent in the surfacing of the refractory body.

CHARLES LADD NORTON.